United States Patent [19]

Reiboldt et al.

[11] Patent Number: 5,282,304
[45] Date of Patent: Feb. 1, 1994

[54] METHOD FOR ASSEMBLING A THIN-FILM BEAM SPRING VALVE

[75] Inventors: H. Norman Reiboldt, College Corner; Ronald W. Kock, Wyoming, both of Ohio

[73] Assignee: The Procter & Gamble Company, Cincinnati, Ohio

[21] Appl. No.: 85,246

[22] Filed: Jun. 29, 1993

Related U.S. Application Data

[63] Continuation of Ser. No. 897,213, Jun. 11, 1992, abandoned.

[51] Int. Cl.$^5$ .............................................. B23P 11/02
[52] U.S. Cl. ........................................ 29/451; 53/470
[58] Field of Search ............... 29/451, 213.1, 221.6, 29/225, 229, 230, 235, 801, 890.12, 890.124, 890.126; 53/470, 489; 222/211, 212

[56] References Cited

U.S. PATENT DOCUMENTS

| | | | |
|---|---|---|---|
| Re. 32,383 | 3/1987 | Banks et al. | 53/449 |
| 194,617 | 8/1877 | Purdy . | |
| 812,968 | 2/1906 | Williams . | |
| 1,564,759 | 12/1925 | Creque | 215/11.5 |
| 2,124,648 | 7/1938 | Brennan | 220/44 |
| 2,335,978 | 12/1943 | Vogt | 18/56 |
| 2,451,578 | 10/1948 | Rosefield | 43/131 |
| 3,204,387 | 5/1962 | Scheindel | 53/470 |
| 3,240,399 | 3/1966 | Frandeen | 222/211 |
| 3,377,766 | 4/1968 | Nelson | 53/27 |
| 3,423,818 | 1/1969 | Ruekberg | 29/451 |
| 3,648,903 | 3/1972 | Marchant | 222/212 |
| 3,653,111 | 4/1972 | Bruce | 29/200 R |
| 3,757,651 | 9/1973 | Bruce et al. | 93/36.01 |
| 3,894,381 | 7/1975 | Christine et al. | 53/128 |
| 4,159,790 | 7/1979 | Bailey | 222/211 |
| 4,305,424 | 12/1981 | Wankel | 137/851 |
| 4,408,702 | 10/1983 | Horvath | 222/212 |
| 4,533,068 | 8/1985 | Meierhoefer | 222/189 |
| 4,545,491 | 10/1985 | Bisgaard et al. | 215/11 D |
| 4,599,123 | 7/1986 | Christensson | 156/69 |
| 4,658,989 | 4/1987 | Bonerb | 222/105 |

(List continued on next page.)

FOREIGN PATENT DOCUMENTS 85113071.6  5/1986  European Pat. Off. ...... B29C 49/22

OTHER PUBLICATIONS

AMPCO, "Proven Applications for Pressblowing!", Jan. 1988, 1 page.
AMPCO, "What is Pressblowing?", date unknown, 1 page.

(List continued on next page.)

*Primary Examiner*—Mark Rosenbaum
*Assistant Examiner*—Kenneth J. Hansen
*Attorney, Agent, or Firm*—E. Kelly Linman; Michael E. Hilton; Ronald W. Kock

[57] ABSTRACT

A method and apparatus for assembling a thin film beam spring vent valve is provided. The thin film beam spring vent valve is provided in a squeeze pump package. The package includes an outer resilient bottle and a flexible bag with a relatively rigid fitment. The outer resilient bottle is provided with a substantially cylindrical internal surface portion and an aperture to enable fluid communication between the interior and the exterior of the outer bottle. The valve includes a thin film beam spring located adjacent the aperture such that the beam spring will seal the aperture upon exposure to a positive dispensing pressure within the bottle. The beam spring will allow air to enter the bottle upon the application of negative pressure within the bottle. An automated mechanism is provided for cutting and grasping (e.g., utilizing a vacuum mandrel) a beam spring comprising a predetermined length of a band of flexible material. The vacuum mandrel is then inserted into the bottle adjacent the substantially cylindrical internal portion such that upon release of the vacuum the beam spring expands against the substantially cylindrical internal surface of the bottle such that central portion of the beam spring is adjacent the aperture. A method and apparatus for inserting the flexible bag into the outer bottle of the squeeze pump package is also provided.

8 Claims, 16 Drawing Sheets

U.S. PATENT DOCUMENTS

| | | | |
|---|---|---|---|
| 4,696,145 | 9/1987 | Schmidt et al. | 53/436 |
| 4,842,165 | 6/1989 | Van Coney | 222/95 |
| 4,845,821 | 7/1989 | Sakimori | 29/213.1 |
| 4,865,224 | 9/1989 | Streck | 222/95 |
| 5,035,106 | 7/1991 | Haase | 53/470 |
| 5,091,142 | 2/1992 | Petit | 376/261 |
| 5,165,578 | 11/1992 | Laible | 222/212 |

OTHER PUBLICATIONS

AMPCO, "General Information About Pressblowing", Jan. 1987, 1 page.

Novotechnics, Inc., "How The Pressblower Works", date unknown, 4 pages.

Novotechnics, Inc., "Pressblowing: Another Method of Blow Molding", date unknown, 4 pages.

Commonly Assigned Copending Application, Serial No. 712,007, filed Jun. 7, 1991 and entitled "Resilient Squeeze Bottle Employing Air Check Valve Which Permits Pressure Equilibration In Response To A Release In Atmospheric Pressure".

METHOD FOR ASSEMBLING A THIN-FILM BEAM SPRING VALVE

This is a continuation of appl. Ser. No. 07/897,213, filed on Jun. 11, 1992, now abandoned.

BACKGROUND OF THE INVENTION

1. Field of the Invention

The present invention relates to methods and apparatus for assembling vent valves; and more particularly, to such a method and apparatus for assembling thin film vent valves.

2. Description of the Prior Art

One utilization for vent valves are in packages commonly referred to as "squeeze pump" packages. Such packages typically have a resilient outer bottle and a flexible inner bag. As the resilient outer bottle is squeezed, a positive pressure develops in the space between the flexible bag and the squeeze bottle. This increased air pressure around the flexible bag causes the bag to collapse against the product. Fluid product is then typically forced to flow through a fluid product valve and out of the squeeze pump package through a discharge orifice. Upon releasing the squeeze force, a vent valve is often utilized to permit atmospheric air to be drawn into the space between the flexible bag and the squeeze bottle as the outer bottle returns towards its original shape.

Common vent valves include ball check valves, rubber duckbill valves, rubber umbrella valves, and thin film valves. Due to material cost savings, thin film valves are potentially very economical when compared with other types of reliable vent valves. Thin film valves have previously included a thin film of plastic material attached adjacent to one or more apertures such that the thin film material closes (thereby sealing) the apertures in response to a positive (i.e., superatmospheric) pressure in the bottle, and unseals the apertures in response to a negative (i.e., subatmospheric) pressure therein. An advantage of such thin film valves is that a very low cracking pressure will initiate venting. To date, however, the thin film material of such vent valves have typically been attached (via heat sealing or adhesive) to a flat, inner surface, of a bottle. Since installation of the thin film material is normally against an inner surface of the bottle, placement and attachment may be difficult operations and/or may require that the package be made of several components to allow ready access to the film attachment point.

The present invention provides a method and apparatus for assembling a thin film beam spring vent valve which does not require attachment of the thin film material to an inner surface lo of the bottle (although such attachment may be utilized), the resilience of the thin film material helps maintain the thin film material in the proper location adjacent the aperture.

SUMMARY OF THE INVENTION

In accordance with one aspect of the present invention a method is provided for assembling a thin film beam spring vent valve. The thin film beam spring vent valve opens to permit air to enter a bottle in response to negative pressure inside the bottle, and closes to prevent air from exiting the bottle in response to positive pressure developed inside the bottle. The method includes the step of creating an aperture in a substantially cylindrical internal surface portion of the bottle to provide communication between the interior and the exterior of the bottle. A beam spring comprising a predetermined length of a band of flexible beam spring material is automatically grasped so that the beam spring is wrapped partially around an arcuate surface, e.g., a cylindrical mandrel. The arcuate surface (holding the beam spring) is inserted into the bottle to a location adjacent the substantially cylindrical internal surface portion such that upon release of the beam spring, the beam spring expands against the substantially cylindrical internal surface of the bottle so that the central portion of the beam spring is located adjacent the aperture. The beam spring is then released.

In accordance with another aspect of the present invention an apparatus is provided for assembling a thin film beam spring vent valve. The thin film beam spring vent valve opens to permit air to enter a bottle in response to negative pressure inside a bottle, and closes to prevent air from exiting the bottle in response to positive pressure developed inside the bottle. The apparatus includes means for creating an aperture in a substantially cylindrical internal surface portion of the bottle to provide communication between the interior and the exterior of ti A means for automatically grasping a beam spring comprising a predetermined length of a band of flexible beam spring material such that the beam spring is wrapped partially around an arcuate surface, e.g., a cylindrical mandrel. Means for inserting the arcuate surface into the bottle to a location adjacent the substantially cylindrical internal surface portion such that upon release of beam spring, the band of beam spring expands against the substantially cylindrical internal surface of the bottle so that the central portion of the beam spring is located adjacent the aperture is also provided. In addition, means for releasing the beam spring is included.

BRIEF DESCRIPTION OF THE DRAWINGS

While the specification concludes with claims which particularly point out and distinctly claim the invention, it is believed the present invention will be better understood from the following description of a preferred embodiment(s) taken in conjunction with the accompanying drawings, in which like reference numerals identify identical elements and wherein:

DESCRIPTION OF THE PREFERRED EMBODIMENT

I. Thin Film Beam Spring Valve

Figure 1:
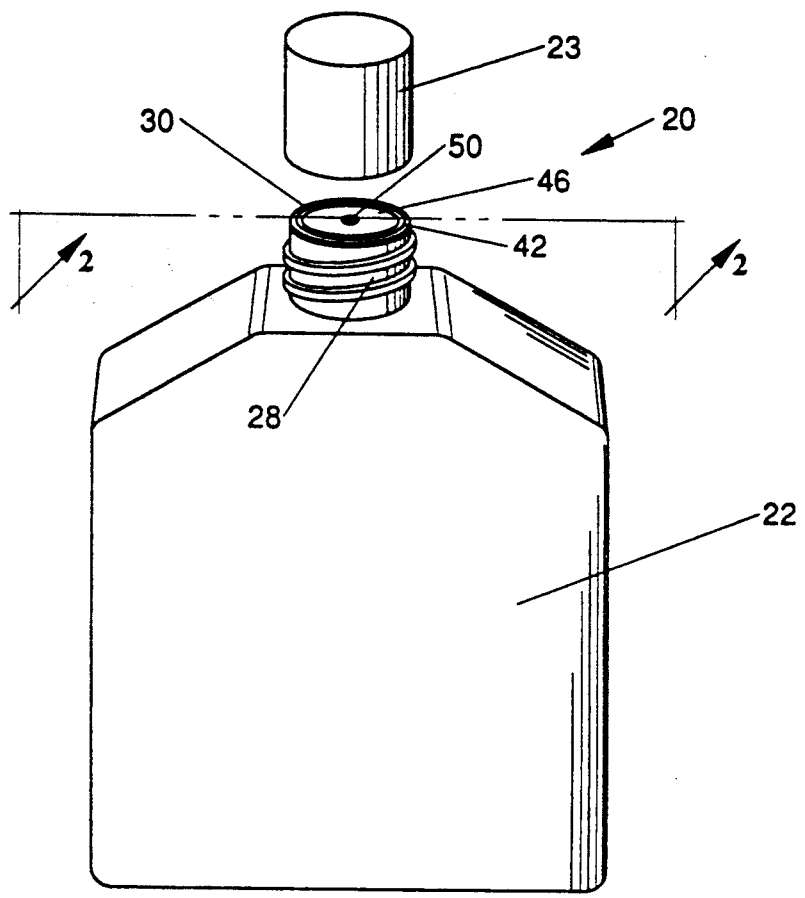
FIG. 1 is an exploded perspective view of a squeeze pump package incorporating a particularly preferred embodiment of a thin film beam spring vent valve.
Figure 2:
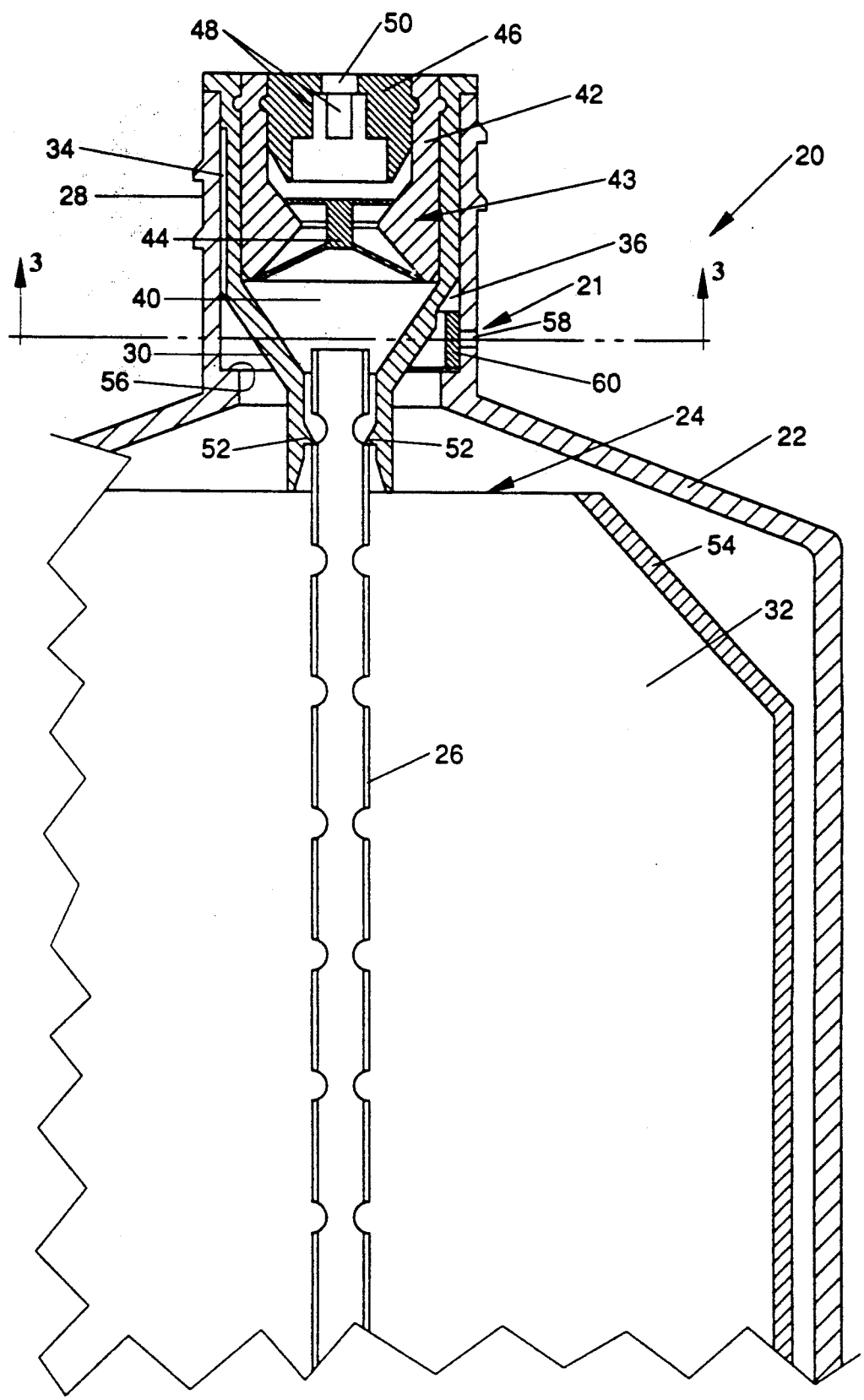
FIG. 2 is a fragmentary cross-section view of the squeeze pump package of FIG. 1 taken along line 2—2 of FIG. 1.
Figure 3:
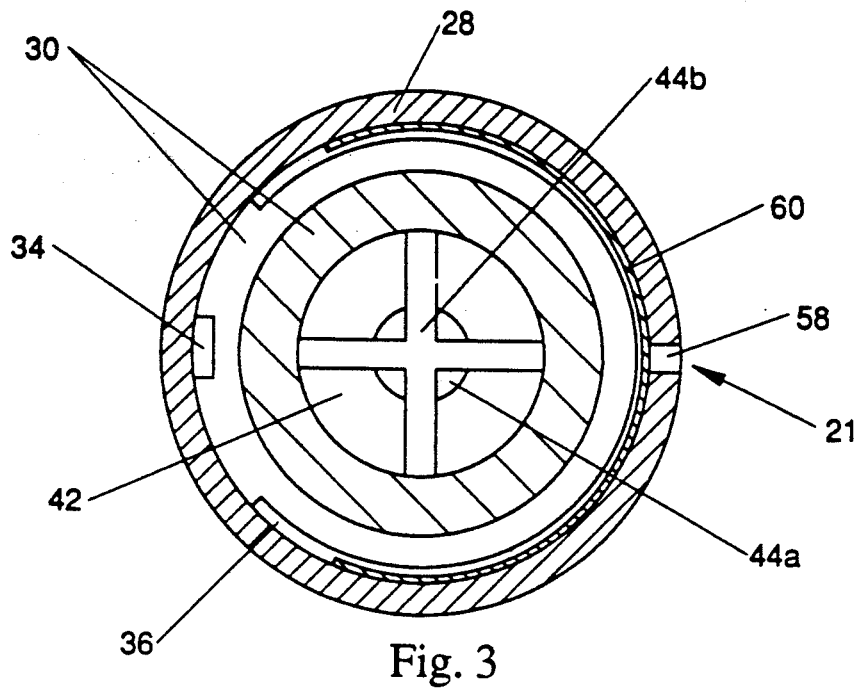
FIG. 3 is a cross-section view of the finish of the squeeze pump package of FIG. 1 taken along line 3—3 of FIG. 2.

Referring to FIGS. 1 through 3, a particularly preferred embodiment of a thin film beam spring valve, indicated generally as 21, is illustrated in conjunction with a squeeze pump package, indicated generally as 20. Basically, the illustrated squeeze pump package 20 includes a resilient outer bottle 22, a flexible inner bag 24, and an apertured diptube 26. The outer bottle 22 includes a finish 28 which has a substantially cylindrical internal surface portion.

Figure 4:
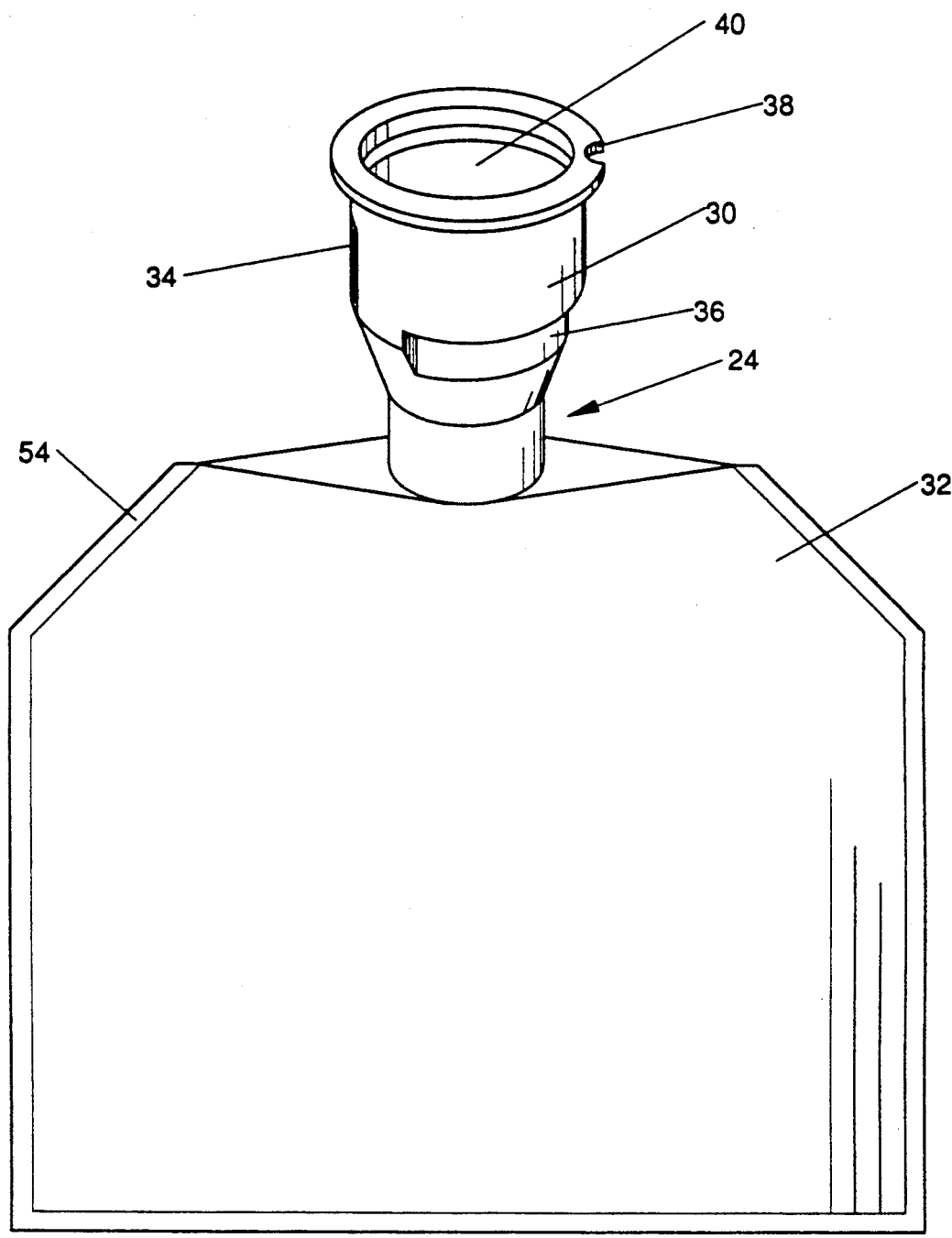
FIG. 4 is a perspective view of a particularly preferred flexible bag.

Referring to FIG. 4, the flexible bag 24 includes a hollow rigid fitment 30 and a flexible envelope portion 32. The fitment 30 preferably includes a recessed air vent channel 34, a recessed portion 36 and means for orientating the fitment 30 (such as the illustrated notch 38). The orienting means 38 enables the fitment 30 to be properly oriented to the bag material of the envelope portion 32; and subsequently, the bag 24 can be properly oriented to the outer bottle 22. The bottom portion of the fitment 30 preferably has a smaller outer diameter than the rest of the fitment 30 which minimizes the chance of trapping the envelope portion 32 between the fitment 30 and the finish 28 during the insertion process described hereinafter.

Referring to FIG. 2, the fitment 30 has an internal dispensing passage 40 which is preferably adapted to accommodate a product valve, indicated generally as 43. The illustrated product valve 43 includes a valve housing 42 and a resilient member 44. The resilient member (as seen in FIG. 3) has an upper disc-like portion 44a and a lower portion with four radially extending arms 44b. In addition, a retaining plug 46 having internal protrusions 48 and a dispensing orifice 50 is provided. The retaining plug 46 may also include an extended flange (not seen) to provide a solid flat external surface surrounding the dispensing orifice 50. The retaining plug 46 and the product valve 43 are snap-fit into place. The product valve 43 is similar to the valve disclosed in U.S. Pat. No. 4,408,702 issued to Horvath on Oct. 11, 1983 (without the venting feature); the disclosure of which is hereby incorporated herein by reference. The product valve 43 may also be a suckback type valve such as disclosed in U.S. Pat. No. 4,842,165 issued to Van Coney on Jun. 27, 1989; the disclosure of which is hereby incorporated herein by reference. The fitment 30 also preferably includes retaining protrusions 52 for holding the diptube 26 away from the resilient member 44 of the product valve 43. Otherwise, the diptube 26 may interfere with the operation of the product valve 43.

Referring to FIG. 4, the flexible envelope portion 32 of the bag 24 preferably has shoulders 54 which taper such that the tendency of the upper corners of the envelope portion 30 of the bag 24 to become trapped between the fitment 30 and the bottle finish 28 during the insertion process (described hereinafter) is significantly reduced. More preferably, the shoulders 54 taper between about 45 degrees and about 60 degrees up from the vertical axis of the bag 24. The envelope portion 32 is preferably made flat for rapid and inexpensive manufacture. In addition, flexible bags 24 with flat envelope portions 32 have a memory which tends to collapse the envelope portion 32 flat again. On the other hand, bags 24 blown to their expanded shape tend to re-expand when collapsed which can cause the squeeze pump package 20 to lose its prime. The envelope portion 32 of the bag 24 is preferably made of a pliable film ranging from about 0.001 inch to about 0.005 inch thick. Bags 24 with envelope portions 32 which are too thin leave higher residual fluid in the bag 24 after the squeeze pump package 20 has been emptied. Bags 24 with envelope portions 32 which are too thick are more difficult to insert and expand in the bottle 22.

Manufacture of the bag 24 may be accomplished by sealing the oriented fitment 30 to a web of the thin film envelope 32 material and fin sealing around the sides of the envelope 32 to provide a housing for a fluid product. Sealing may be accomplished by any acceptable method; including ultrasonic sealing, adhesive sealing, impulse sealing, and heat sealing. Typically, ultrasonic sealing is preferred. For ultrasonic sealing of the fitment 28 to the envelope 32 material, the fitment 28 and the envelope portion 32 are preferably made of the same material; preferably, low density polyethylene.

Once the fitment 30 is sealed to the envelope portion 32, a hole may be generated in the envelope 32 material in the dispensing passage 40 of the fitment 30 to provide fluid communication therethrough. Such a hole may be achieved by bursting the envelope material with a sharp point, by melting it with a hot poker, or by cutting at least one slit in the thin film material with a blade. Preferably, four radial slits are cut from the center of the annular seal, toward its inner circumference, using four blades attached to a common shaft (not seen). This slitting approach avoids cutting small pieces of film free that could ultimately end up disrupting operation of the squeeze pump package 20.

Returning to FIGS. 1 through 3, the outer bottle 22 includes a cap 23 and a body with a cylindrical finish 28 which has an inwardly protruding ledge 56 (seen best in FIG. 2) near its lower end. The finish 28 also includes an aperture 58 (or apertures) located therein. A thin film beam spring 60 is located substantially against the substantially cylindrical interior surface of the bottle finish 28, above the ledge 56, covering the aperture 58. The central portion of the curved beam spring 60 is located adjacent the aperture 58 in the finish 28. The "central portion" of the beam spring 60, as used herein, is intended to connote that portion of the beam spring 60 which rests substantially against the inner surface of the finish 28. Typically, this is all but about the last 0.25 inch on each end, since the end portions tend to become straight rather than conform to the circumference of the finish 28.

It is not necessary that the beam spring valve 21 (including aperture 58 and beam spring 60) provide an absolute seal when the valve 21 is closed. In fact, it may be desirable that the beam spring 60 not completely seal the aperture 58 upon closing. Thus the terms "close" or "seal" (or variations thereof) as used herein are intended to connote that the valve 21 is substantially sealed or substantially closed such that essentially no air passes through the aperture 58 during the brief time (typically about one to about ten seconds) it takes to dispense product from the squeeze pump package 28; a "closed" or "sealed" beam spring valve 21 may permit air to pass through the aperture 58 to enable equilibrium to be reached with the surrounding atmosphere (e.g., to enable equilibration upon changes in altitude) within a period ranging from about 15 minutes to about 6 hours. Thus, the beam spring valve 21 may include a means for enabling equilibration within a period ranging from about 15 minutes to about 6 hours.

The equilibration means may include roughened or otherwise slightly raised areas on either the inner surface of the finish 28, or upon the surface of the beam spring 60 itself; or the beam spring 60 may be relatively weak such that substantial sealing does not occur between dispensing operations; or the beam spring 60 may be made of a material which is somewhat breathable. One breathable film which might be used is between about 1.0 mils to about 2.0 mils thick and is available from EXXON Chemical Company of Buffalo Grove, Ill., under the designation Exaaire ® Breathable Membrane. In cases where an equilibration means is used, the valve 21 may require that a minimum change in pressure occur over a relatively rapid time period to provide a suitable "dispensing pressure."

To ensure that the thin film beam spring 60 makes good contact to seal the aperture 58 under positive dispensing pressure, the method used to form the aperture 58 should not result in an area around the aperture 58 being raised significantly towards the beam spring 60. This helps ensure more reliable sealing of the aperture 58 by the beam spring 60. Consequently, the periphery of the aperture 58 preferably has slightly inwardly (i.e., away from the beam spring 60) rounded edges on the inner surface of the finish 28. A burst-type punch (i.e., similar to a leather punch) from the inside of the bottle finish 28 towards the outside may be utilized to form the aperture 58. A cutting mechanism such as a clean shear-cut center punch (i.e., using a pin and an apertured anvil) is preferred; again from the inside towards the outside of the finish 28. Both methods provide an economical and reliable means to form the aperture 58 with slightly inwardly rounded peripheral edges on the inner surface of the finish 28. Of course, the aperture 58 may be molded in the finish 28; e.g., in an injection blow molding process.

Figure 5A:
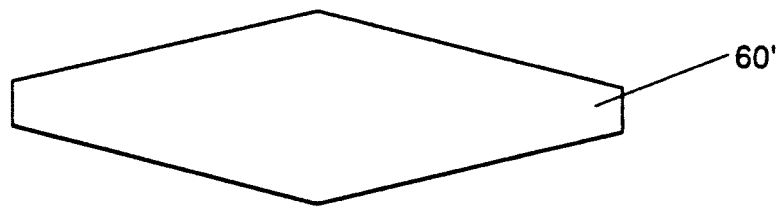
FIG. 5a is a top plan view of a preferred thin film beam spring which may be utilized int he thin film beam spring valve.
Figure 5B:
FIG. 5b is a top plan view of another preferred thin film beam spring which may be utilized in the thin film beam spring valve.

Referring to FIG. 2, since molded plastic parts seldom have perfect shapes, it is difficult to insure that the internal surface of the finish 28 will be perfectly cylindrical. If the inner surface of the bottle finish 28 expands toward the ledge 56, the lower ends of the beam spring 60 may bind against the lower ledge 56. Likewise, if the inner surface of the bottle finish 28 expands toward the top of finish 28, the ends of the beam spring 60 may bind against the fitment 30. Either situation may hinder sealing of the aperture 58 by the beam spring 60. One way to reduce these tendencies is to utilize a beam spring 60' which has the double equilateral trapezoid shape illustrated in FIG. 5a. Preferably, however (due to manufacturing considerations) the beam spring 60 has a rectangular shape as illustrated in FIG. 5b.

A combination of factors, including the shape, thickness, width, length, material composition of the beam spring 60 and the diameter of the internal cylindrical finish 28 act to provide a beam spring 60 which will both seal and vent air through the aperture 58. The combination of factors preferably provides a thin film beam spring vent valve 21 which has a desired cracking pressure less than about 3.0 inches of water. Cracking pressure is measured by the water column height outside the aperture 58 that allows water to just crack the valve 21 and cause dripping to begin.

The beam spring 60 may be manufactured of any thin film material which will provide the desired functionality; examples include cellulose triacetate, low density polyethylene and polypropylene. The less rigid materials, such as low density polyethylene, are capable of sealing apertures 58 with rougher surrounding areas, since they are softer. The more rigid materials provide more spring force against the aperture 58. Polypropylene with a thickness of about 0.002" is most preferred, since it provides a good balance between softness and springiness. With regard to material selection, it has been observed that static electricity associated with some materials can negatively effect the ease of inserting beam springs 60 into the bottle finish 28, unless appropriate steps are taken.

The length of the beam spring 60 must be sufficient to seal the aperture 58 in response to a positive dispensing pressure. The length of the beam spring 60 is preferably greater than about 50% of the internal circumference of the finish 28; more preferably, the beam spring 60 length is between about 60% and about 70% of the internal circumference of the finish 28. In addition to being simple to manufacture, this highly preferred beam spring 60 configuration enables the ends of the beam spring 60 to slide circumferentially when venting the bottle 22. This may provide lower cracking pressures. However, the beam spring valve 21 is believed to open, at least partially, by reverse bending of the beam spring 60 in the proximity of the aperture 58.

Generally, the width of the beam spring 60 is sufficient that it will operate to seal the aperture 58 in response to a positive dispensing pressure; taking into consideration some migration of the beam spring 60. The amount of lateral migration of the beam spring 60 can be limited somewhat by the fitment 30 and the inwardly projecting ledge 56 (seen in FIG. 2 and discussed below). Generally, the width of the beam spring 60 is preferably between about two times and about three times the diameter of the aperture 58. Thus, for an aperture 58 having a diameter of about 0.09 inch, the preferred width is between about 0.18 inch and about 0.27 inch. In addition, if a normally sealed beam spring valve 21 is desired, it may be preferable to adjust the width of the beam spring 60 to provide the necessary force against the interior surface of the bottle finish 28 to provide the desired functionality. Of course, the greater the width, the more sensitive the beam spring 60 is to taper of the interior surface of the bottle finish 28.

As discussed above, the beam spring 60 tends to migrate somewhat laterally (i.e., with respect to the beam spring 60) upon successive operation of the beam spring valve. Consequently, it is highly desirable to provide a means for limiting this lateral migration so that the beam spring 60 will not migrate to a position where it no longer covers and seals the aperture 58 in response to a positive dispensing pressure. One suitable means for limiting lateral (and longitudinal) migration could be provided by attaching one end of the beam spring 60 to the interior surface of the finish 28; e.g., with adhesive or heat sealing. A highly preferred means for limiting migration is provided by maintaining barriers above and below the beam spring 60 such that its lateral migration is limited; more preferably, limited to less than about one aperture 58 diameter. As seen in FIG. 2, the ledge 56 below and the fitment 30 above (as discussed hereinafter) limit the lateral migration of the beam spring 60.

The beam spring 60 also tends to rotate longitudinally (again, with respect to the beam spring 60) in the bottle finish 28 during successive venting operations. Therefore, it is also highly desirable to limit longitudinal migration of the beam spring 60. Such longitudinal rotation is inconsequential until one leg of the beam spring 60 approaches the aperture 58. Since the portion of the beam spring 60 nearest each end may tend to be straight rather than curved, this portion of the beam spring 60 (i.e., near the ends) may not provide good sealing. Longitudinal movement of the beam spring 60, therefore, is preferably limited to insure that the central portion of the beam spring 60 remains adjacent the aperture 58. Again this means may be provided by the attachment of one end of the beam spring 60 to the inner surface of the finish 28. As seen in FIG. 3, the fitment 30 of this embodiment provides a much more preferred structure for limiting longitudinal migration of the beam spring 60.

Continuing with FIGS. 2 and 3, the fitment 30 includes a recessed portion 36 shaped such that when the fitment 30 is friction fit into the finish 28 of the bottle 22, a cavity is provided for accommodating the beam spring 60. The beam spring 60 is housed within this cavity between the fitment 30 and the finish 28 such that the beam spring 60 cannot migrate so far or laterally that the beam spring 60 no longer covers and seals the aperture 58 in response to a positive dispensing pressure. The process of assembling the beam spring valve 21 and the process of inserting the rigid fitment 30 (preferably attached to an envelope portion 32) is described hereinafter.

The dispensing operation for the illustrated squeeze pump package 20 is typical. A squeezing force is provided against the resiliently deformable side walls of the squeeze bottle 22. This squeeze force provides a positive dispensing pressure which causes the thin film beam spring vent valve 21 to close and the air between the flexible bag 24 and the squeeze bottle 22 to be compressed. This creates increased air pressure around the flexible bag 24 which causes the envelope portion 32 to collapse against the fluid product. The fluid product is then forced to flow through and around the loosely inserted dip tube 26; through the fluid product valve 43; and out of the squeeze pump package 20 through the dispensing orifice 50. The apertured diptube 26 provides a means to permit substantially all of the product to be dispensed from the bag 24 by insuring a flow path to pockets which may form as the envelope portion 32 of the bag 24 collapses.

Upon releasing the squeeze force, the resiliently deformable side walls of the outer bottle 22 return towards their original shape. This return generates a small negative pressure (i.e., vacuum) inside the bottle 22. The product valve 43 closes, preventing air from entering the flexible bag 24 via the dispensing passage 40. This small vacuum (i.e., negative pressure) acts to lift the beam spring 60 away from the aperture 58 to allow outside air to enter. Thus, atmospheric air is vented into the space between the flexible bag 24 and the squeeze bottle 22 through the thin film beam spring vent valve 21 located in the bottle finish 28. The operation of a similar squeeze pump package is disclosed in U.S. Pat. No. 4,842,165 issued to Van Coney on Jun. 27, 1991, the disclosure of which is hereby incorporated herein by reference. Of course, the apertured diptube 26 of this embodiment could be replaced by an inner flexible bag 24 which inverts, as disclosed in the above-referenced Van Coney patent.

II. Method and Apparatus for Assembling a Thin Film Beam Spring Vent Valve

It is highly preferable to automate the process of assembling a thin film beam spring vent valve 21. One highly preferred method and apparatus for accomplishing the assembly of a thin film beam spring vent valve 21 is illustrated in FIGS. 6 through 13 and described below.

Figure 6:
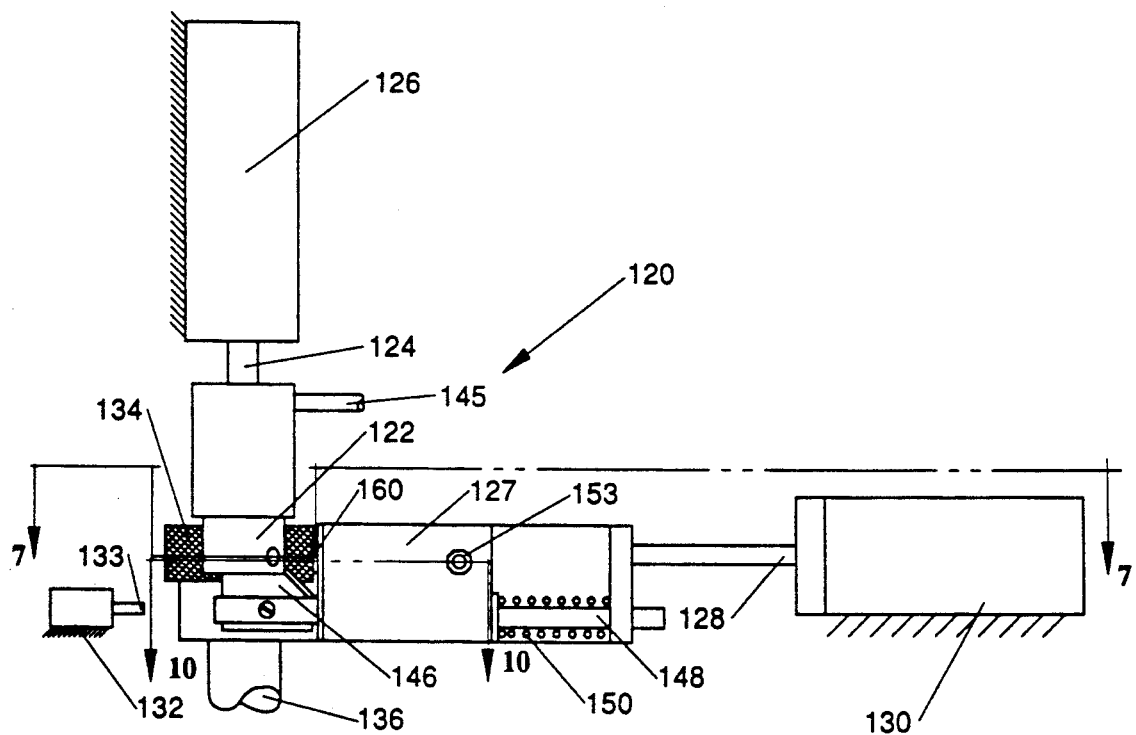
FIG. 6 is a side elevation view of a particularly preferred apparatus for inserting a beam spring into a bottle.

Referring to FIG. 6, the apparatus, indicated generally as 120, basically includes a vacuum mandrel 122 connected to the distal end of a reciprocating rod 124 of a non-rotating vertical air cylinder 126; a slide block 127 connected to the distal end of the reciprocating rod 128 of a non-rotating horizontal air cylinder 130; and a second horizontal air cylinder 132. All of the air cylinders 126, 130 and 132 are attached to a frame (not seen) which may also support a bottle 22 such that the finish 28 is aligned vertically beneath the vacuum mandrel 122. The apparatus 120 may also include a programmable electronic controller (not seen) to automatically control the sequence of operations.

Figure 7:
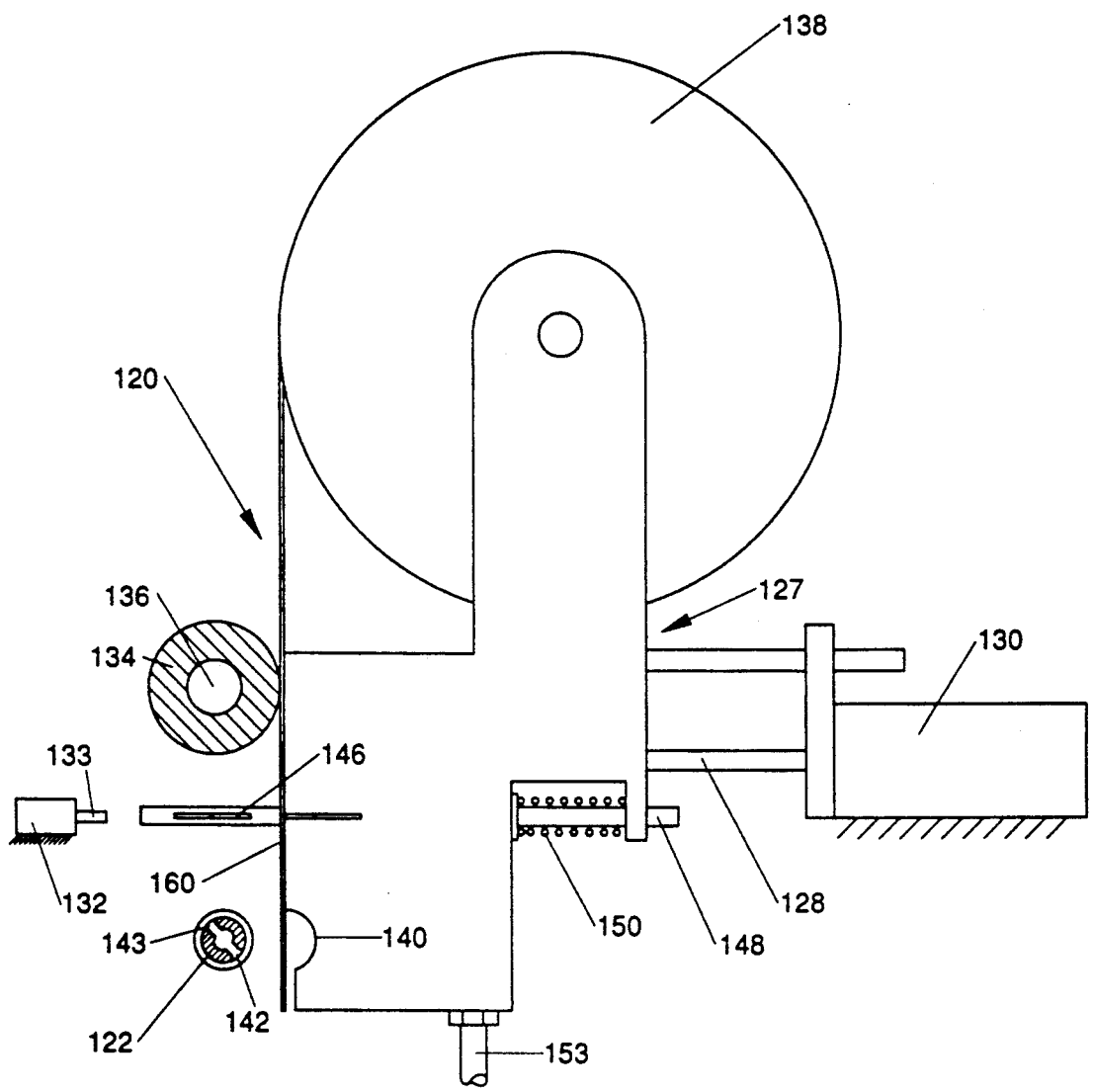
FIG. 7 is a cross-section view of the particularly preferred apparatus taken along line 7—7 of FIG. 6.
Figure 8:
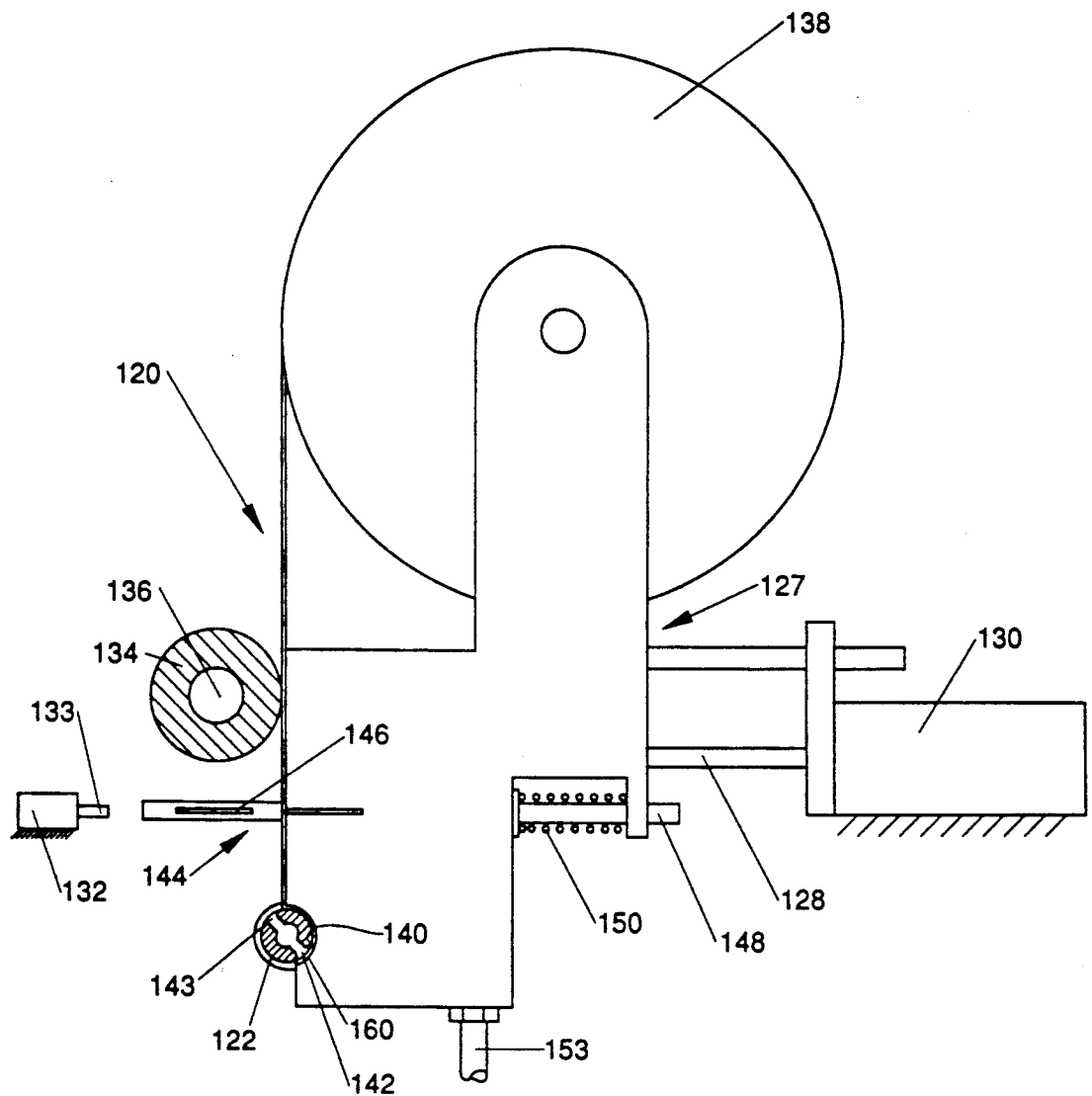
FIG. 8 is a cross-section view similar to FIG. 7 illustrating the apparatus during the next step of the beam spring insertion method.

Referring to FIG. 7, a friction wheel 134 is first activated using an electric motor (not seen) attached to the wheel shaft 136. The friction wheel 134 rotates counterclockwise to draw and cantilever the lead end of the beam spring material 160 off a reel 138 past the wheel nip. Thus, the friction wheel 134 provides a means for feeding stock beam spring material 160. The beam spring material 160 now extends past an arcuate surface 140 in the slide block 127 which substantially corresponds to the outer surface of the vacuum mandrel 122. The vacuum mandrel 122 includes two vacuum apertures 142 and 143 oriented such that each vacuum aperture 142 and 143 may hold an end of the beam spring 60 when it is wrapped around the mandrel 122. The vacuum is supplied to the vacuum apertures 142 and 143 from a vacuum source (not seen) through coupling 145. As seen in FIG. 8, the reciprocating rod 128 of the first non-rotating horizontal air cylinder 130 extends to move the accurate surface 140 of the slide block 127 against the vacuum mandrel 122 to hold the extended end of the beam spring material 160 therebetween. During this operation the friction wheel 134 does not turn.

This causes the extended distal end of the beam spring material 160 to be held against the first vacuum aperture 142 of the vacuum mandrel 122. Thus, a means for holding the beam spring material 160 against the first vacuum aperture 142 is provided.

Figure 9:
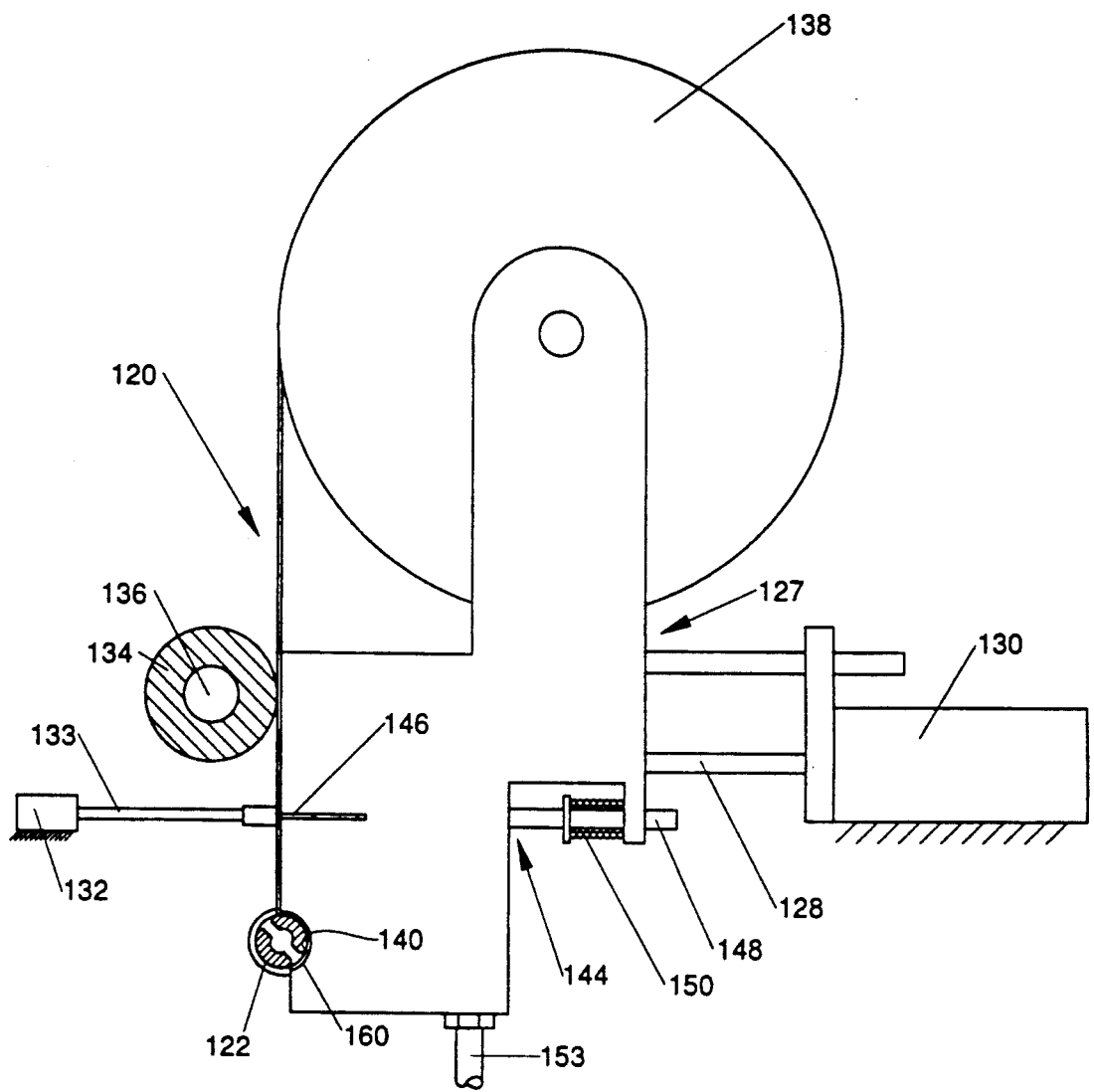
FIG. 9 is a cross-section view similar to FIG. 8 illustrating the apparatus during the next step of the beam spring insertion method.

Referring to FIG. 9, the distal end of the reciprocating rod 133 of the second horizontal air cylinder 132 pushes against a spring loaded knife mechanism (indicated generally as 144), thereby cutting the beam spring material 160 to length, thereby forming a thin film beam spring 60. The knife mechanism 144 includes a triangular shaped blade 146 attached to a rod 148 which passes through a portion of the slide block 127. The knife blade 146 is biased by a spring 150 toward the second horizontal air cylinder 132. Thus, a means for cutting the beam spring material 160 to create an appropriately sized beam spring 60 is provided. Preferably the vacuum of the mandrel vacuum 122 is turned on prior to cutting the beam spring material 160.

Figure 10:
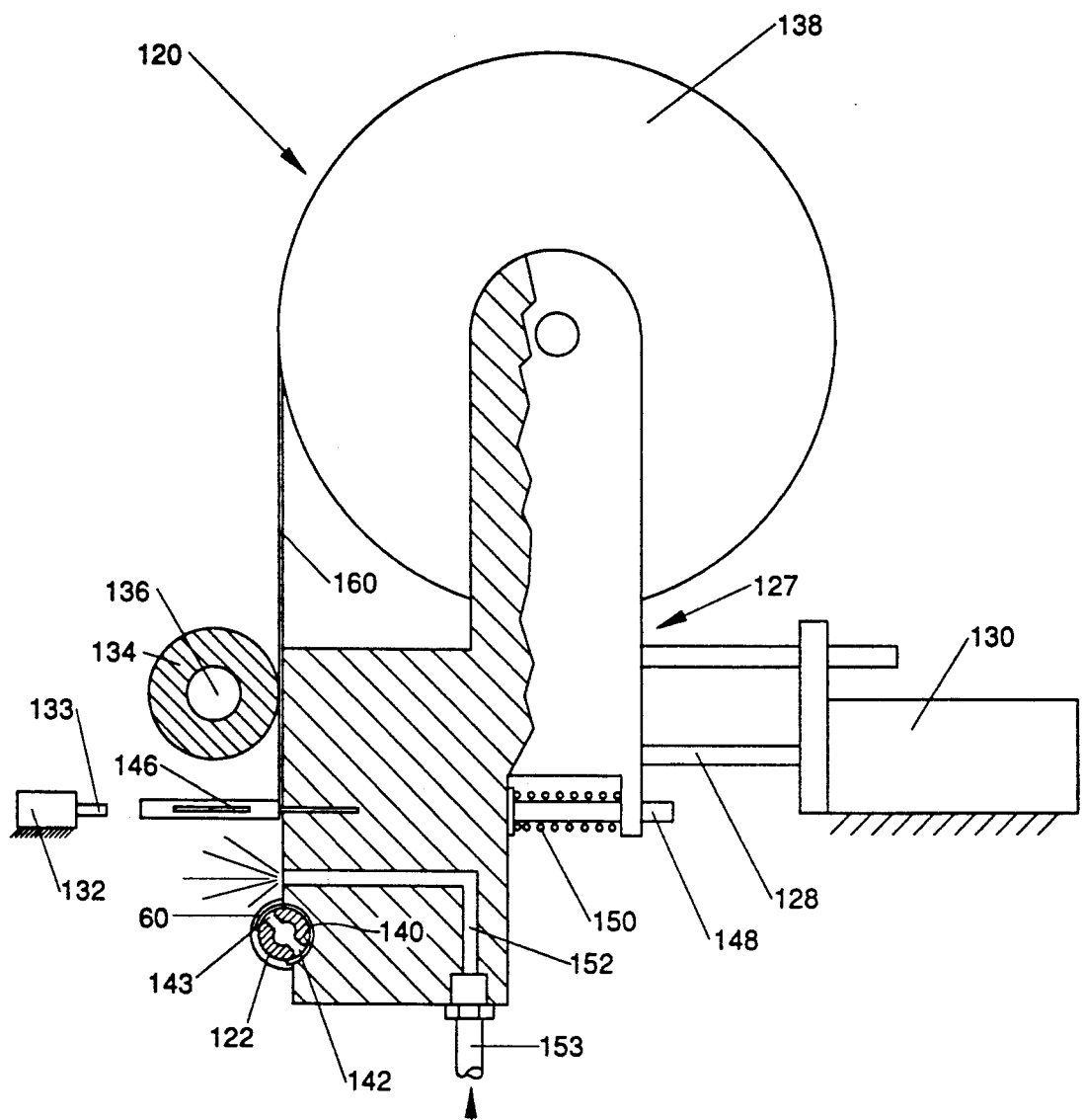
FIG. 10 is a cross-section view taken along line 10—10 of FIG. 6, illustrating the apparatus during the next step of the beam spring insertion method.
Figure 11:
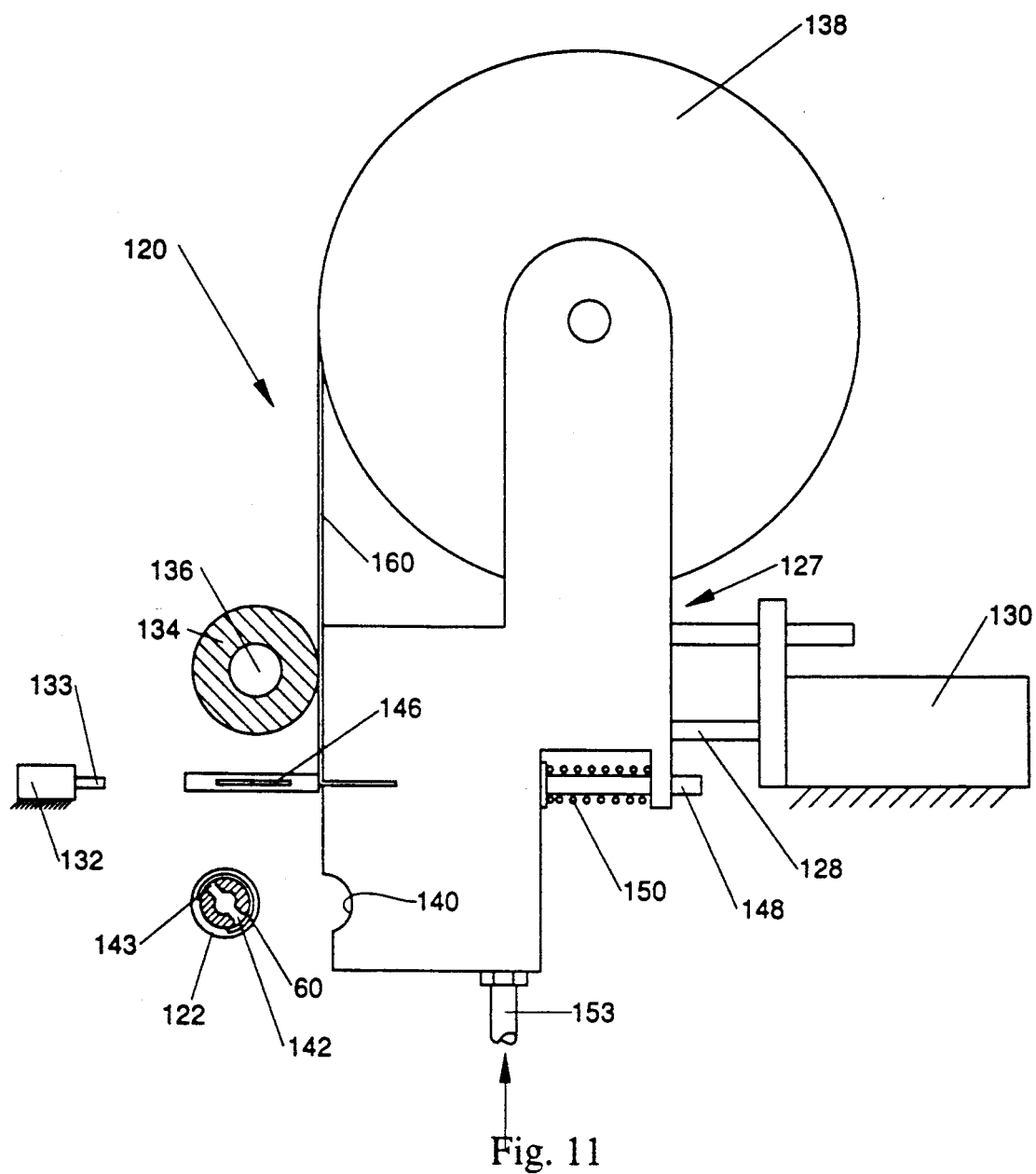
FIG. 11 is a cross-section view similar to FIG. 9 illustrating the apparatus during the next step of the beam spring insertion method.

Referring to FIG. 10, the reciprocating rod 133 of the second horizontal air cylinder 132 retracts, permitting the knife blade 146 to return to its original position under operation of the spring 150. A blast of air is released through an air passage 152 from an air source (not seen) through coupling 153. This air blast blows the second end of beam spring 60 around the vacuum mandrel 122 where it is grasped by the second vacuum aperture 143. Thus, the air blast through the air passage 152 provides a means for locating the second end of the beam spring 60 adjacent the second vacuum aperture 143 such that the beam spring 60 is grasped by the vacuum mandrel 122. Additionally, the vacuum of the apertures 142 and 143 provides a means for holding the beam spring 60 around the mandrel. As seen in FIG. 11, the slide block 127 retracts while the beam spring 60 remains wrapped around the mandrel 122 by vacuum.

Figure 12:
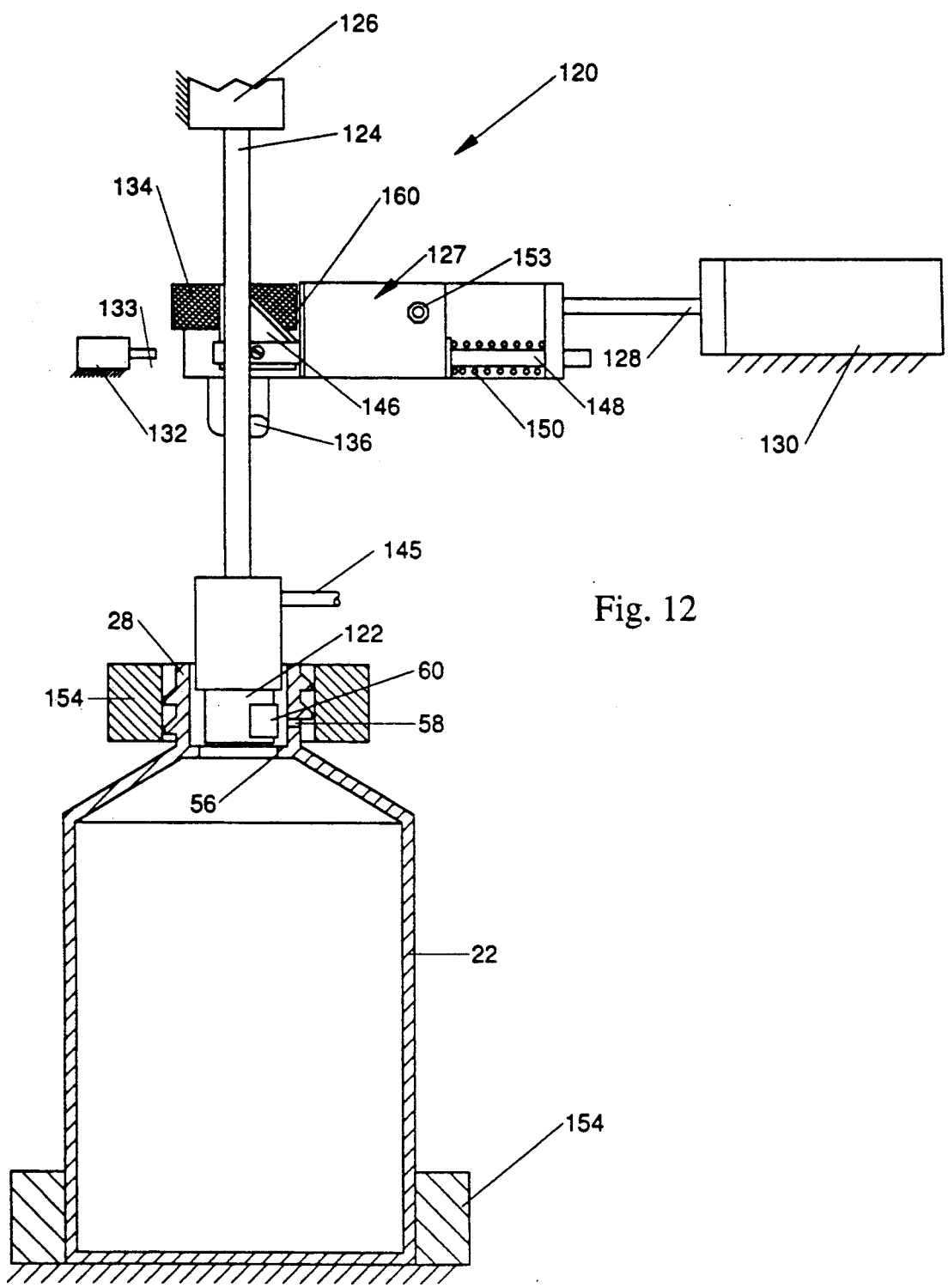
FIG. 12 is a side elevation view similar to FIG. 6 in conjunction with a cross-sectional view of an outer bottle.
Figure 13:
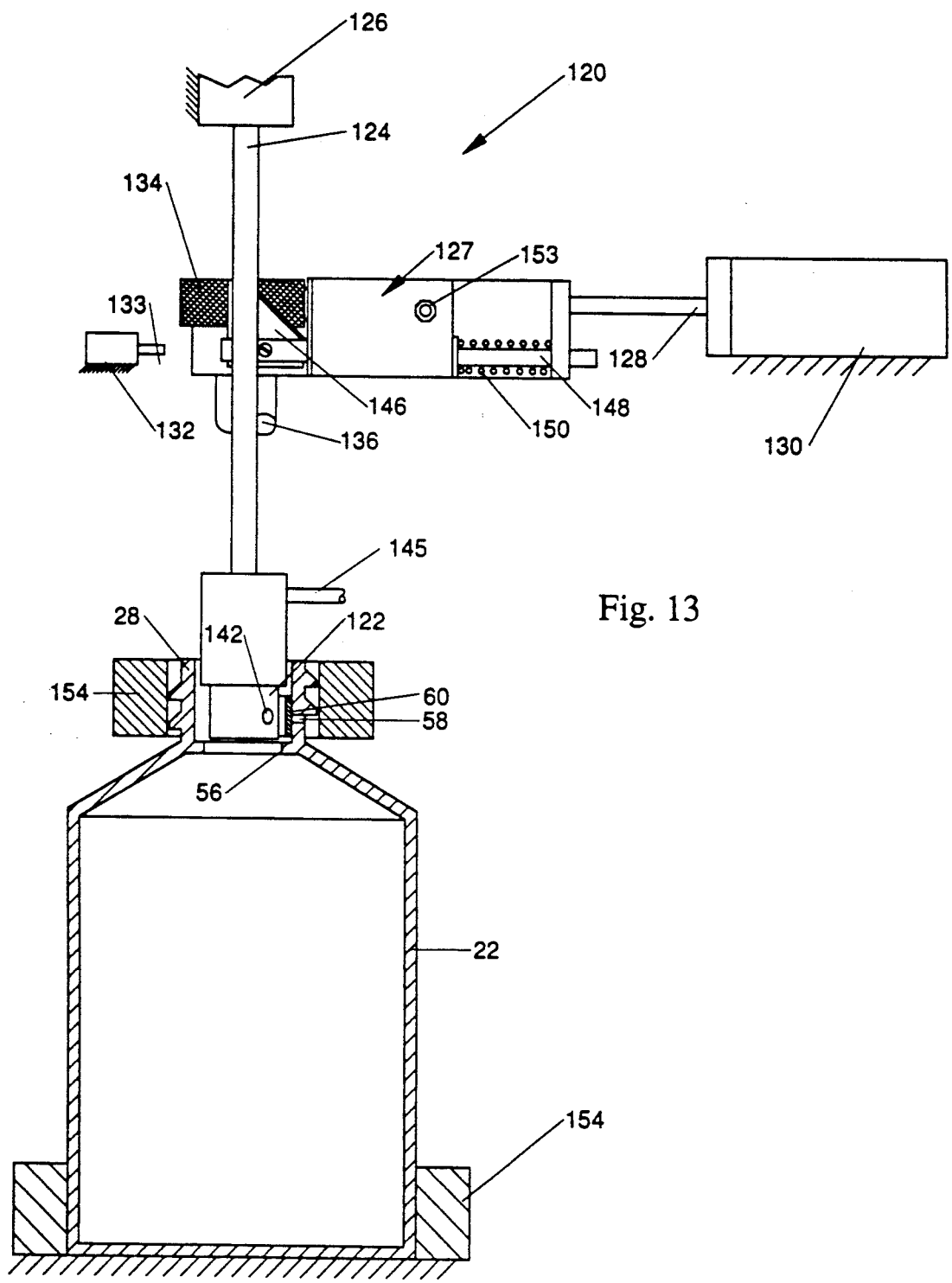
FIG. 13 is a side elevation view and cross-section view of an outer bottle similar to FIG. 12 showing the curved beam spring in place in the bottle.

Referring to FIG. 12, retraction of the slide block 127 provides room for the vacuum mandrel 122 to be lowered into the bottle finish 28. An aperture 58 is previously formed in the finish 28 as described above. The bottle 22 is oriented and appropriately located by inserting the bottle 22 into a means for locating the bottle 22; such as the illustrated bottle holder 154 similar to the bottle positioning/orienting means 225 seen in FIG. 14. The mandrel 122 is lowered by extension of the reciprocating rod 124 of the non-rotating vertical air cylinder 126 until the central portion of beam spring 60 is located inside the bottle finish 28 adjacent the aperture 58, and just above the ledge 56. As seen in FIG. 13, when the mandrel vacuum 122 is turned off the beam spring 60 is released. The released beam spring 60 rapidly expands against the internal surface of the finish 28. Thus, the mandrel 122 provides a means for locating the beam spring 60 adjacent the aperture 58. The mandrel 122 retracts and the bottle 22 is replaced by a new one. A fitment 30 may be inserted into the bottle 22 to reduce migration of the beam spring 60 as discussed above and below.

III. Method and Apparatus for Inserting a Bag into a Bottle

A particularly preferred method and apparatus for inserting a flexible bag 24 having a rigid fitment 30 into a bottle 22 is illustrated in FIGS. 14 through 19 and discussed below. The apparatus, indicated generally as 220, basically includes a non-rotating vertical air cylinder 222; a funnel 224; and preferably, a bottle guide 225 attached to a frame 221. The bottle guide 225 locates the bottle 22 in the proper location and orientation for the bag 24 insertion process. The apparatus 220 may also include a programmable and electronic controller (not seen) which controls the sequence of operations.

Figure 14:
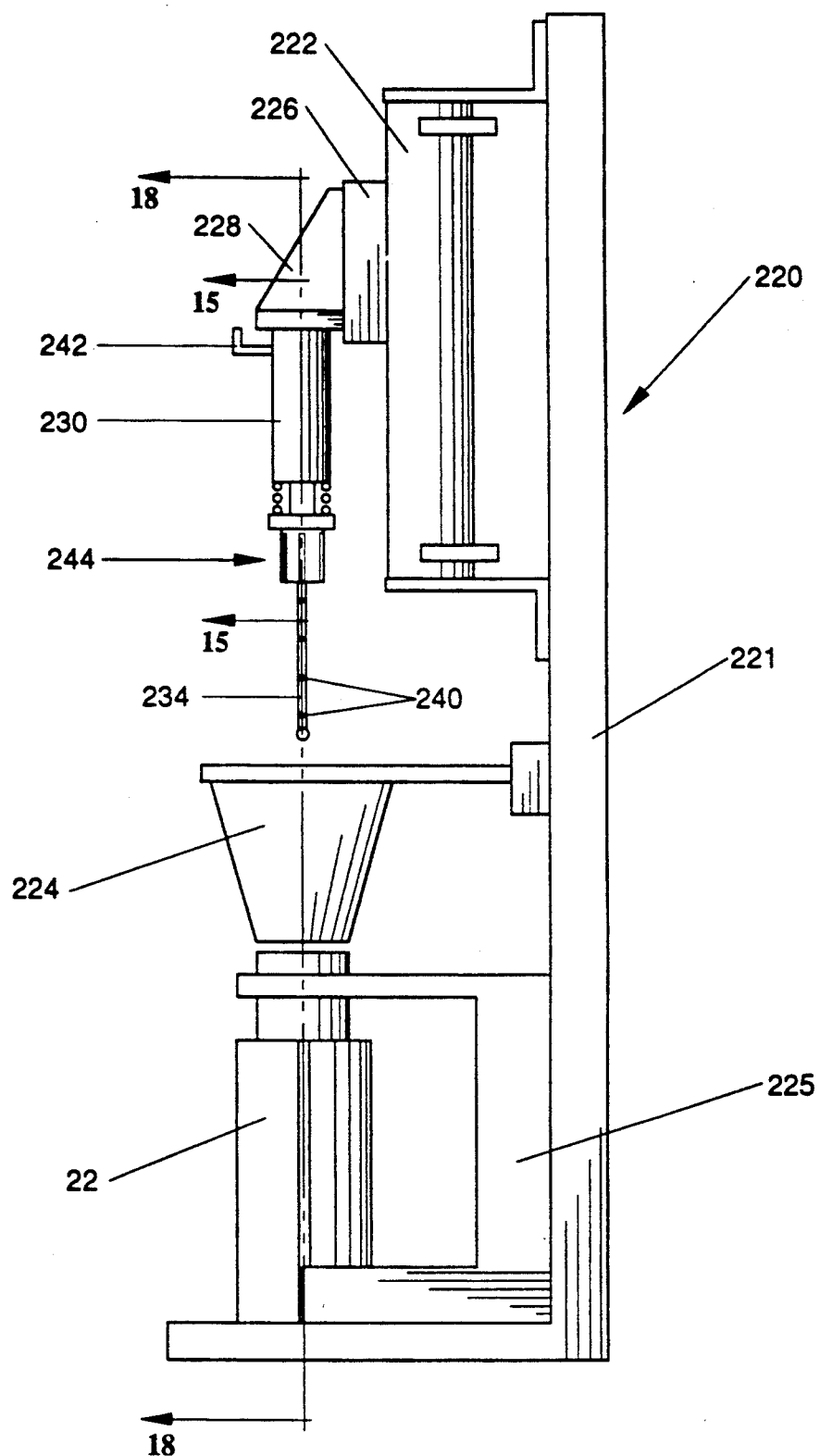
FIG. 14 is a side elevation view of a preferred apparatus for inserting a flexible bag into the outer resilient bottle.
Figure 15:
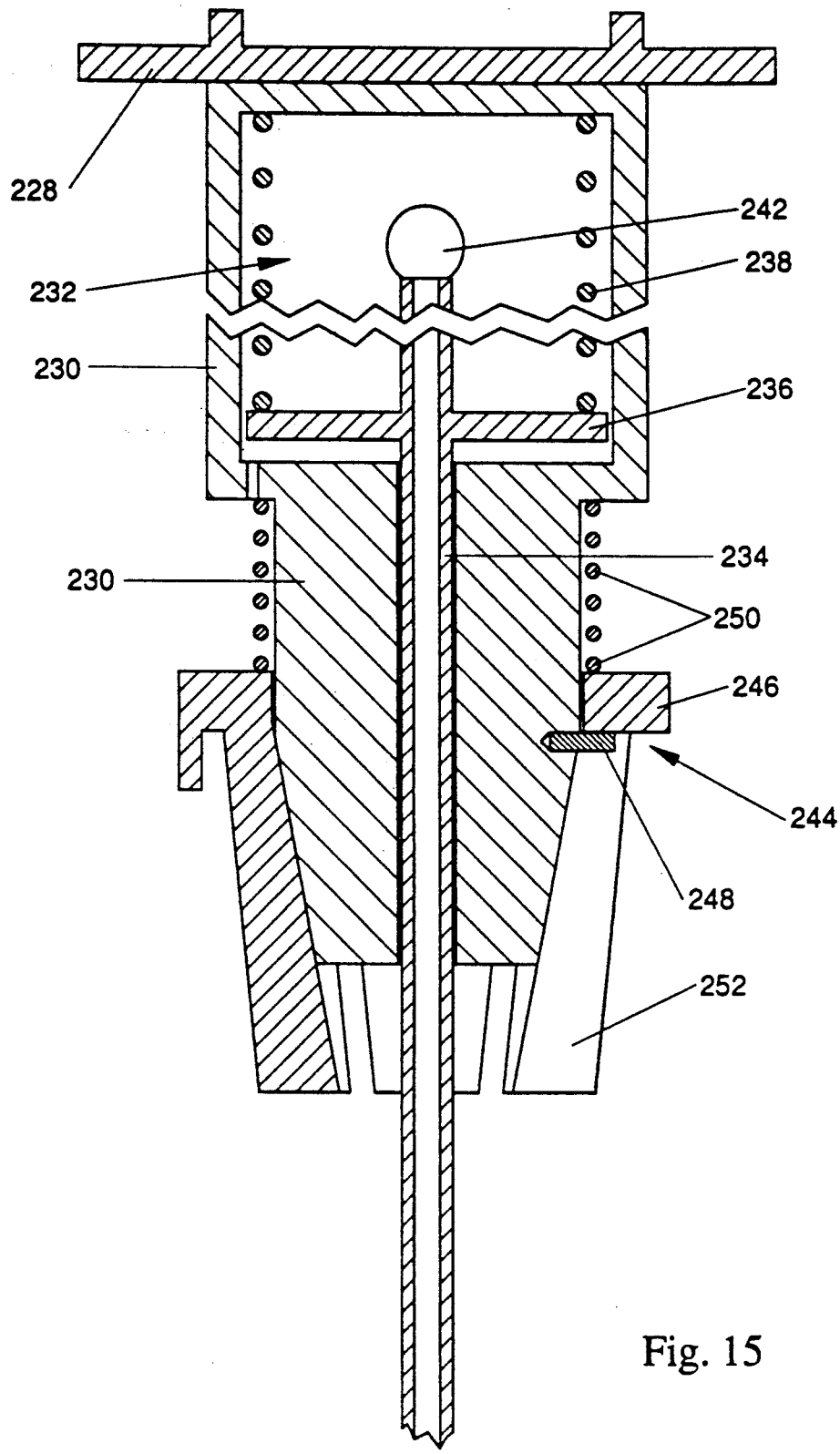
FIG. 15 is a cross-section view of the hollow rod, spring loaded friction chuck and spring loaded plunger taken along line 15—15 of FIG. 14.

Referring to FIGS. 14 and 15, the nonrotating vertical air cylinder 222 includes a side mounted reciprocating member 226. Attached to the reciprocating member 226 is a bracket 228, from which a hollow rod 230 depends. Internal to the hollow rod 230 is a chamber 232 which houses the upper end of a downwardly biased plunger 234. The plunger 234 is biased using an annular flange 236 which extends from the plunger 234 near its upper end and a spring 238 located between the annular flange 236 and the interior of the hollow rod 230. The lower end of the plunger 234 includes a plurality of radial holes 240 which are in fluid communication with an air and/or vacuum source (not seen) provided through the coupling 242 at the upper end of the hollow rod 230. The radial holes 240 may be directionally oriented toward the final location of the side seals of the flexible bag 24.

A grasping chuck 244 is attached to the distal end of the hollow rod 230. The grasping chuck 244 is adapted to be inserted into the end of the rigid fitment 30 and to engage the orienting notch 38 and grasp the fitment 30; preferably via friction. The grasping chuck 244 includes an outer expanding sleeve 246 and the hollow rod 230. The outer expanding sleeve 246 is slidably attached to the hollow rod 230 and is biased downward against a stop 248 by a spring 250. The outer sleeve 246 has a multiplicity of fingers 252 spaced apart by grooves. Together, the fingers 252 of the grasping chuck 244 have a slight conical outer surface and a more pronounced inner conical surface.

The hollow rod 230 has a conical tapered outer surface at its lower end which operates as a cam to spread the fingers 252 when the grasping chuck 244 is lifted against the spring 250. The spring 250 has a relatively low spring constant so that when the fitment 30 of the bag 24 is pushed onto the chuck 244 the fingers 252 spread to securely grip the fitment 30 via the friction between the fingers 252 and the fitment 30. The grasping chuck 244 may grasp the fitment 30 automatically or manually; either before, during, or after the flexible bag 24 is manufactured.

Figure 18:
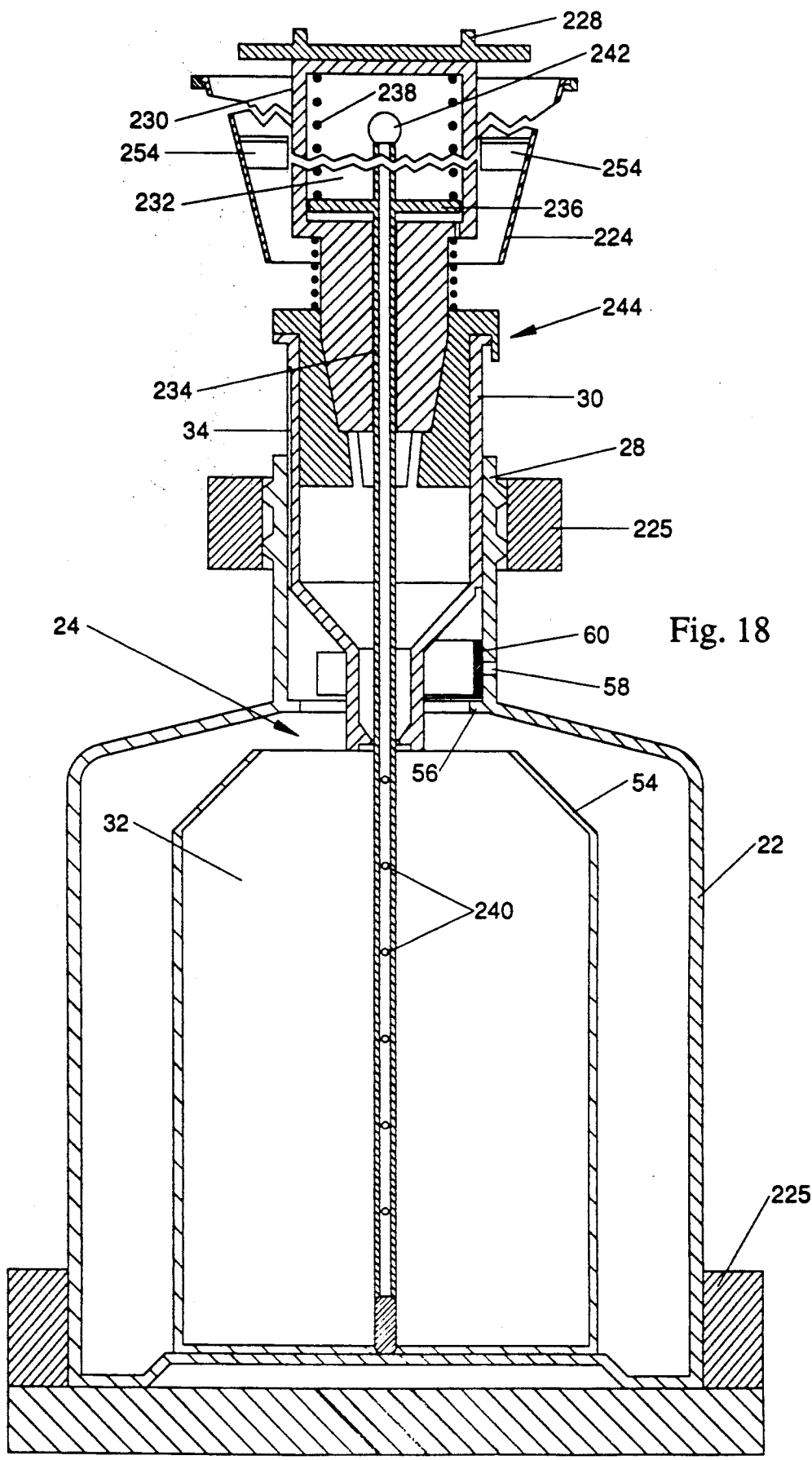
FIG. 18 is a cross-section view of the inner flexible bag being inserted into the outer resilient bottle taken along line 18—18 of FIG. 14.

As the grasping chuck 244 engages the fitment 30, the plunger 234 which extends downwardly through the center of the friction chuck 244 is inserted into the flexible bag 24 (seen in FIG. 18). With the plunger 234 biased downwardly, and since the plunger 234 is longer than the axial length of the bag 24, the plunger 234 pushes against the bottom of the bag 24. The biasing force of the plunger 234 is great enough to push the bag 24 through the funnel 224 and the bottle finish 30, but not so great that the bag 24 seals are broken.

One exemplary plunger 234 is a brass tube with an outer diameter of about 0.125 inch. An acrylic cylinder with rounded end with a diameter of about 0.25 inch is glued to the bottom of the brass tube. The biasing force on the spring-loaded plunger 234 is about 0.5 pounds with a maximum load of about 1.25 pounds.

Figure 16:
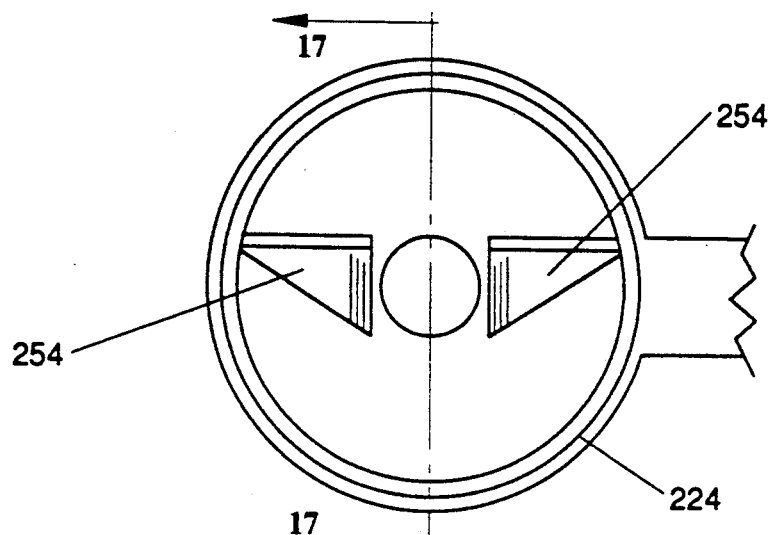
FIG. 16 is a top plan view of the funnel of FIG. 14.
Figure 17:
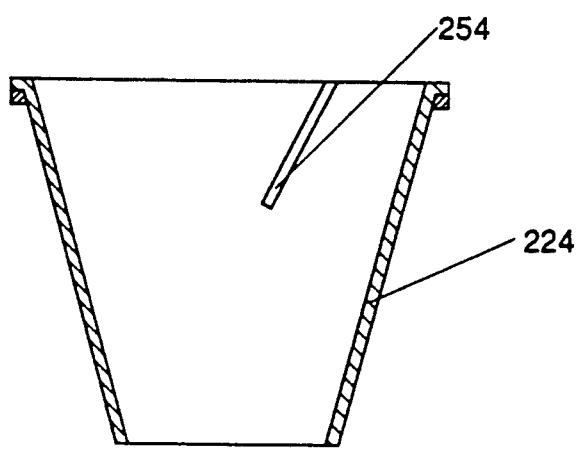
FIG. 17 is a cross-section view of the funnel taken along line 17—17 of FIG. 16.

Once the fitment 30 is loaded onto the friction chuck 244, the reciprocating member 226 of the air cylinder 222 moves downwardly to push the bag 24 through the funnel 224. Referring to FIGS. 16 and 17, the funnel 224 includes means for folding the envelope portion 32 of the bag 24 in a predetermined manner so the envelope portion 32 will reliably expand inside the bottle 22 when air is supplied through the plunger 234 without damaging the bag 24. It is highly preferable that the predetermined folding configuration be a "C" fold. The means for folding the bag in a "C" fold configuration includes two triangular plows 254 extending from the interior surface of the funnel 224. The plows 254 are angled (preferably at about 30 degrees) relative to the axis of the funnel 224. The upper ends of the plows 254 are preferably attached to the funnel 224 surface slightly off-center from the funnel 224 axis so the bag 24 does not catch on the plows 254 as it enters the funnel 224. In addition, the large end of the funnel 224 is preferably larger in diameter than the width of the bag 24 when the bag 24 is flat. As the bag 24 is inserted, the plows 254 contact the edges of the bag 24 and urge them to fold over so the envelope portion 32 of the bag 24 is folded into a "C" shape as the bag 24 progresses through the funnel 224.

Preferably, a vacuum is applied to the bag 24 through the radial holes 240 of the plunger 234 as the bag is inserted through the funnel 224 and into the bottle 22. The vacuum is preferably initiated immediately prior to pushing the bag 24 through the funnel 224. The vacuum helps stiffen the envelope portion 32 of the bag 24, which allows the plows 254 to more uniformly fold the bag in the predetermined configuration.

One exemplary funnel 224 which may be utilized is a commercially available high density polyethylene conical funnel 224 with an open end diameter of about 4 inches, length of about 5 inches, and exit opening diameter of about 0.9 inch. The funnel 224 could have a 60 degree included angle along the upper half of its length, changing to a steeper angle at the bottom half. Two parallel triangular plows 254, might be offset about 0.375 inch from the centerline of the funnel 224 at the top. Each plow 254 could be about 0.12 inch thick and hot melt glued to the inside surface of the upper half of the funnel 224 at a 30 degree angle. Each plow 254 could have a width of about 1.38 inches and there might be a constant vertical gap between the plows 254 of about 1.5 inches.

As the bag 24 is pushed through the funnel 224, the bag 24 exits the funnel 224 and enters the bottle 22 through the finish 28. The internal diameter of the small end of the funnel 224 (i.e., the funnel exit) is preferably slightly larger than the internal diameter of the bottle finish 28. This permits the fitment 30, with its larger overall diameter, to pass completely through the funnel 224 and out the small end of the funnel 224. When a beam spring 60 is used, the funnel 224 exit size and location should enable insertion of the bag 24 without adversely disturbing the beam spring 60. In addition, the ledge 56 of the bottle finish 28 acts to guide the bag 24 away from the beam spring 60 as the envelope portion 32 of the bag 24 passes through the finish 28 so that the bag 24 does not adversely disturb the beam spring 60. To accomplish this function for a bottle finish 28 having dimensions similar to those described herein, the width of the ledge 56 is preferably from about 0.05 inch to about 0.08 inch.

Referring to FIG. 18, the bottom of the bag 24 is pushed all the way to the bottom of the bottle 22 by the plunger 234. The bag 24 is longer than the bottle 22 in order to enable the bag 24 to fill out the inside of the bottle 24 when expanded. Therefore, it is useful to have the plunger 234 resiliently mounted and biased (as seen in FIG. 15) so that when the plunger 234 contacts the bottom of the bottle 22, the chuck 244 can continue to push the fitment 30 into bottle finish 28. The chuck 244 pushes the fitment 30 into the finish 28 until it is in the location illustrated in FIG. 18, where it is held in place by friction. At this point any vacuum may be turned off.

With the fitment 30 in this location, an air vent channel 34 is formed between the finish 28 and the fitment 30 to provide a fluid communication passage between the interior of the bottle 22 (i.e., the space between the bag 24 and the bottle 22) and the atmosphere. At this point the envelope portion 32 of the bag 24 is expanded inside the bottle 22. Compressed air is supplied through coupling 242 and through the plunger 234 and out the radial holes 240 to expand the bag 24. One exemplary approach to expanding the bag 24 with compressed air is to provide 30 PSIG air through the plunger 234 into the bag 24 for 3 seconds allowing air to escape through the space between the plunger 234 and the fitment 30. Another exemplary approach to expanding the bag 24 with compressed air is to develop from about 3 to about 5 PSIG of air in the bag 24 for about 3 seconds; without permitting air to escape out of the bag 24 through the fitment 30. An alternative to utilizing compressed air to expand the bag 24 is to use a pressurized filling operation. Simultaneous with bag 24 expansion, air in the space between the bag 24 and the bottle 22 is expelled to the atmosphere through the air vent channel 34.

Subsequently, the fitment 30 is fully seated in the bottle finish 28, thereby sealing the air vent channel 34. The seating operation may be done by further extending the reciprocating member 226 of the air cylinder 222. Alternatively, the seating operation may be done manually or automatically after retraction of the air cylinder 2. Retraction of the air cylinder reciprocating member 226 retracts the hollow rod 230 allowing the fingers 252 of the outer sleeve 246 to contract, thereby releasing the fitment 30.

The diptube 26 is inserted loosely into the bag 24 through the fitment 30 until it is held in the bag 24 by the internal protrusions 48. The bag 24 is filled through dispensing passage 40 of the fitment 30. The diptube 26 may be inserted after the filling operations is complete. Quite unexpectedly however, it is preferred that the bag 24 be filled through the diptube 26. A filling nozzle (not seen) is simply inserted into the diptube 26 about 0.5 inch. Filling through the diptube 26 significantly reduces the amount of air which becomes entrained in the fluid during the filling operation. This is particularly critical for relatively viscous fluids. Upon completion of the filling operation, the product valve 43 and the retaining plug 46 may be snap fit inside the fitment 30 as illustrated in FIG. 2.

One exemplary squeeze pump package 20 which includes an outer bottle 22, a thin film beam spring vent valve 21 and an inner flexible bag 24 having a relatively rigid fitment 30 is described below. This exemplary squeeze pump package 20 is preferably assembled using the method and apparatus for assembling a thin film beam spring vent valve 21, and the method and apparatus for inserting a flexible bag 24 into a bottle 22 as described herein.

An outer bottle 22 may be used which is made of polypropylene copolymer and is similar in appearance to that illustrated the drawings. The outer bottle 22 has a finish 28 with an internal diameter of about 0.735 inch; an aperture 58 with a diameter of about 0.09 inches; and an internal ledge 56 which protrudes perpendicularly about 0.06 inch inwardly from the internal surface of the bottle finish 28. The body of the bottle 22 has a major axis of about 2.75 inches; a minor axis of about 1.375 inches; and a fluid capacity of about 6 ounces.

A flexible bag 24 may be used which has an envelope portion 32 which, when flat, measures about 3.63 inches wide; about 4.5 inches tall (at its midpoint); has shoulders 54 which taper about 45 degrees (up from the bag 24 axis); and is adapted to contain about 5 ounces of fluid. The fitment 30 is similar in appearance to that illustrated in the drawings. The fitment 30 includes a recessed portion 36 which is about 0.25 inch deep and extends radially about 300 degrees. The fitment 30 also has an air vent channel 34 which is about 0.025 inch deep and about 0.13 inch wide and terminates at its top end about 0.19 inch from the bottom of the flange.

A beam spring 60 may be used which has an appearance similar to that seen in FIG. 5b. The rectangular beam spring is made of about 0.002 inch thick polypropylene with a width of about 0.19 inch and a length of about 1.5 inches. Alternatively, a beam spring 60 may be utilized having an appearance similar to that illustrated in FIG. 5a. The double equal lateral trapezoid beam spring 60 is made of about 0.002 inch thick cellulose triacetate with a width of about 0.19 inch at its ends and about 0.31 inch at its midpoint and a length of about 1.63 inches.

Although particular embodiments of the present invention have been shown and described, modification may be made to the method and apparatus for assembling a thin film beam spring vent valve without departing from the teachings of the present invention. Accordingly, the present invention comprises all embodiments within the scope of the appended claims.

What we claim is:

1. A method for assembling a thin film beam spring of predetermined length into a bottle having an interior and exterior and a substantially cylindrical internal surface portion, said substantially cylindrical internal surface portion having a vent aperture to provide communication between said interior and exterior of said bottle, said thin film beam spring acting with said vent aperture as a vent vale which opens to permit air to enter said bottle in response to negative pressure inside said bottle, and closes to prevent air from exiting said bottle in response to positive pressure inside said bottle, said method comprising the steps of:
    (a) wrapping said thin film beam spring of predetermined length around a vacuum mandrel, said vacuum mandrel having an arcuate surface and vacuum apertures in said arcuate surface, said apertures connected to a source of vacuum in order to hold said thin film beam spring against said arcuate surface of said vacuum mandrel when said vacuum source is opened to said vacuum apertures;
    (b) inserting said arcuate surface of said vacuum mandrel into said substantially cylindrical internal surface portion of said bottle to a location adjacent said vent aperture such that upon release of said thin film beam spring, said beam spring expands against said substantially cylindrical internal surface portion of said bottle to cover said vent aperture; and
    (c) releasing said thin film beam spring from said arcuate surface of said vacuum mandrel.

2. The method for assembling a thin film beam spring according to claim 1, further comprising the step of:
    (d) inserting a fitment into the bottle adjacent the substantially cylindrical internal surface portion such that a cavity containing the beam spring is created which limits the lateral and longitudinal migration of the beam spring.

3. The method for assembling a thin film beam spring according to claim 1, further comprising the step of:
    (e) cutting a band of flexible material to a predetermined length to create the beam spring.

4. A method for assembling a thin film beam spring of predetermined length into a bottle having an interior and exterior and a substantially cylindrical internal surface portion, said substantially cylindrical internal surface portion having a vent aperture to provide communication between said interior and exterior of said bottle, said thin film beam spring acting with said vent aperture as a vent valve which opens to permit air to enter said bottle in response to negative pressure inside said bottle, and closes to prevent air from exiting said bottle in response to positive dispensing pressure inside said bottle, said method comprising the steps of:
    (a) wrapping said tin film beam spring around a mandrel, said thin film beam spring having an extended length before it is cut to a predetermined length, said beam spring of extended length having a first end;
    (b) automatically grasping said first end of said thin film beam spring of extended length by said mandrel, said mandrel having smaller overall dimensions than said substantially cylindrical internal surface portion of said bottle;
    (c) cutting said beam spring of extended length to form said beam spring of predetermined length, said beam spring of predetermined length having a second end where it is cut;
    (d) automatically grasping said second end of said beam spring of predetermined length so that said beam spring is wrapped partially around said mandrel
    (e) inserting said mandrel into said substantially cylindrical internal surface portion of said bottle to a location adjacent said vent aperture such that upon release of said thin film beam spring of predetermined length, said beam spring expands against said substantially cylindrical internal surface portion of said bottle to cover said vent aperture; and
    (f) releasing said thin film beam spring of predetermined length from said mandrel.

5. The method for assembling a thin film beam spring according to claim 4, further comprising the step of:
    (g) inserting a fitment into the bottle adjacent the substantially cylindrical internal surface portion such that a cavity containing the beam spring is created which limits the lateral and longitudinal migration of the beam spring.

6. The method for assembling a thin film beam spring according to claim 4, further comprising the step of:
    (h) extending a predetermined length of beam spring material prior to cutting said beam spring material.

7. The method for assembling a thin film beam spring according to claim 4, wherein both the steps of grasping the first end and grasping the second end of the beam spring include locating each end of the beam spring adjacent an arcuate vacuum mandrel such that a vacuum provided through a vacuum aperture in the vacuum mandrel near each end of the beam spring holds each end in place against the vacuum mandrel.

8. The method for assembling a thin film beam spring according to claim 7, wherein the step of locating the second end of the beam spring adjacent the vacuum aperture of the vacuum mandrel includes providing a blast of air to move the second end of the beam spring adjacent the vacuum aperture, thereby facilitating grasping thereof.

* * * * *

UNITED STATES PATENT AND TRADEMARK OFFICE
CERTIFICATE OF CORRECTION

PATENT NO. : 5,282,304
DATED : FEBRUARY 1, 1994
INVENTOR(S) : H. NORMAN REIBOLDT, RONALD W. KOCK

It is certified that error appears in the above-indentified patent and that said Letters Patent is hereby corrected as shown below:

*Column 1, line 54, after "surface" delete "lo".*

*Column 2, line 24, after "of" delete "ti" and insert therefor -- the bottle. --.*

*Column 2, line 59, after "utilized" delete "int he" and insert therefor -- in the --.*

Signed and Sealed this

Fourth Day of April, 1995

Attest:

BRUCE LEHMAN

Attesting Officer     Commissioner of Patents and Trademarks